United States Patent Office 3,746,512
Patented July 17, 1973

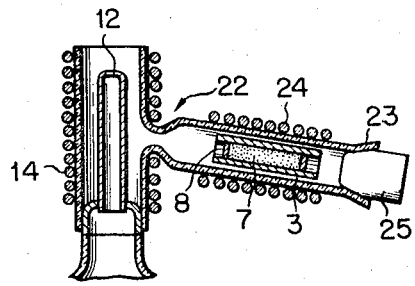
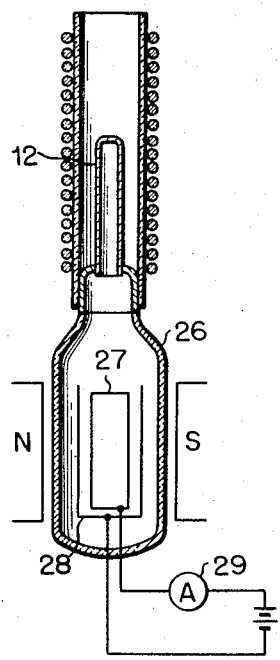
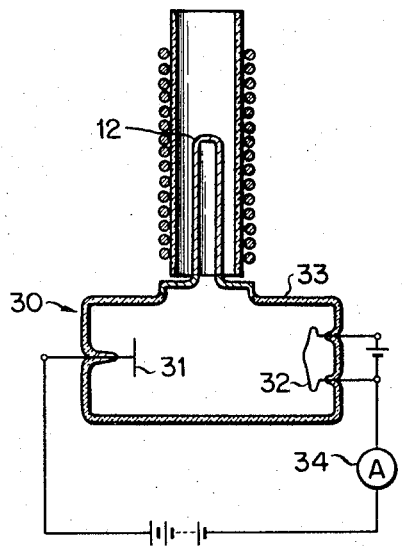

3,746,512
APPARATUS AND METHOD FOR DETERMINING THE ALCOHOLIC CONTENT OF BREATH
Hisashi Kamei and Junji Koezuka, Tokyo, and Masanori Imooka, Kanagawa-ken, Japan, assignors to Tokyo Shibaura Electric Co., Ltd., Kawasaki-shi, Japan
Filed July 14, 1971, Ser. No. 162,443
Int. Cl. G01n 27/70, 33/16
U.S. Cl. 23—232 E
13 Claims

ABSTRACT OF THE DISCLOSURE

An apparatus and method for determining the alcoholic content of breath comprising an alcohol adsorbent; means for heating the adsorbent; a hydrogen gas filter consisting of, for example, palladium; means for heating the filter; a guide pipe for conducting the hydrogen thermally decomposed from alcohol to the hydrogen gas filter; and a vacuum vessel provided with a device for determining the amounts of hydrogen permeating the filter.

---

This invention relates to an apparatus for determining the contents of alcohol and more particularly to an apparatus capable of easily determining the contents of alcohol in the breaths of drivers who happened to drink alcoholic beverage.

Determination of the contents of residual alcohol in the blood of drivers who happened to drink alcoholic beverage is indispensable to strictly discipline drunken drivers. When people drink such beverage the alcohol is generally absorbed into the blood with the resultant drunken condition. While it is most desirable to define the concentration of alcohol in the blood, it is accompanied with a complicated determining operation and various problems possibly raised with the withdrawal of blood. Accordingly, it is practically infeasible to carry out such determination quickly on the road.

The aforesaid discipline has therefore been conducted by causing drivers to exhale their breaths into a toy balloon so as to examine the presence of alcohol therein and in such case indirectly determining the concentration of alcohol in the blood. The conventional process of measuring the alcohol content of human breaths consists in exposing the breaths taken into a toy balloon to prescribed chemicals and observing change in the color of said chemicals resulting from reaction with alcohol, if any. Since control over drunken drivers is generally carried out at night, determination of alcohol contents is likely to present varying results due to the individual different physical and mental conditions of observers, making it difficult to perform accurate determination and also often raising questions about the results of determination.

It is accordingly the primary object of this invention to provide an apparatus capable of determning the alcohol content of drivers' breaths accurately by simple means.

Another object of the invention is to provide an apparatus capable of easily and quickly determining said alcohol content even in dark places at night.

According to this invention, there is provided an alcohol content determining apparatus comprising an alcohol adsorbent receptacle fitted with heating means; a hydrogen gas filter; means for heating said filter; a guide pipe for conducting to said filter the hydrogen gas decomposed from the alcohol thermally vaporized out of the alcohol adsorbent; and a vacuum vessel containing a device for determining the amounts of hydrogen permeating the filter.

Figure 1:
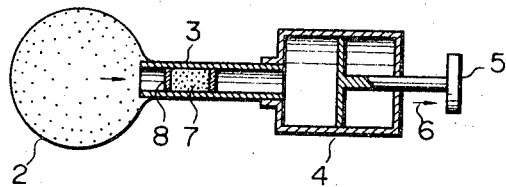
Figure 2:
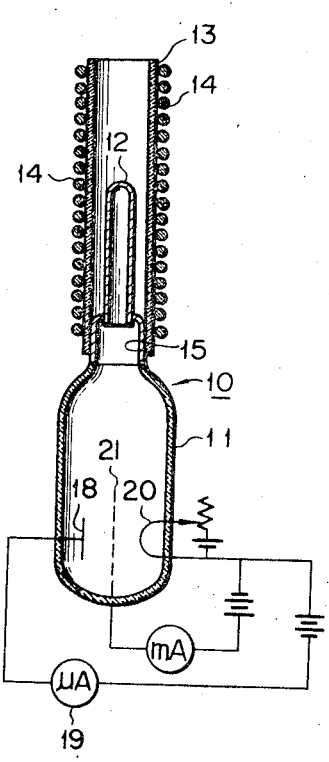
Figure 3:
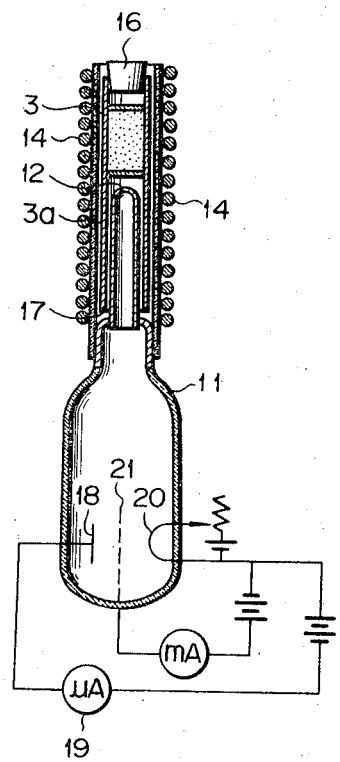

The present invention can be more fully understood from the following detailed description when taken in conjunction with reference to the appended drawings, in which:

FIG. 1 is a sectional view of means for conducting the breaths taken into a toy balloon to an alcohol adsorbent;
FIG. 2 is a schematic sectional view of an alcohol content determining apparatus according to an embodiment of this invention;
FIG. 3 is a sectional view of the apparatus of FIG. 2 in which there is placed said alcohol adsorbent; and
FIGS. 4 to 6 are sectional views of the other embodiments of the invention.

There will now be described by reference to the appended drawings an alcohol content determining apparatus according to this invention.

FIG. 1 illustrates the manner in which a prescribed amount of the breaths of a driver taken into a toy balloon is conducted to an alcohol adsorbent. A toy balloon 2 into which there were blown the breaths of a driver is connected to one end of an adsorbent seal tube 3, the other end of which is connected to a pump 4. When the handle 5 of the pump 4 is drawn in the direction of the arrows 6, the breaths in the toy balloon 2 pass through an adsorbent 7 placed between stoppers 8 made of, for example, glass wool into the cylinder of the pump 4. It is possible to impress graduations on the pump 4 so as to draw a prescribed amount of breaths or to design the cylinder 8 to have a proper volume and always draw a fixed amount of breaths by fully pulling the handle 5.

The adsorbent may suitably consist of silica gel, activated carbon, molecular sieve, or activated alumina which is capable of adsorbing alcohol. When the breaths are conducted through the adsorbent in the aforementioned manner, the alcohol and moisture contained therein are trapped by the adsorbent 7. The seal tube 3 where the alcohol was thus adsorbed is fitted as shown in FIG. 3, into an alcohol content determining device 10. This device 10 comprises, as shown in FIG. 2, an ionization vacuum gauge 11; a tubular hydrogen gas filter 12 communicating with said vacuum gauge 11; a cylindrical protective tube 13 enclosing the filter 12; and a heater 14 disposed on the outer peripheral surface of the protective tube 13. The material of the hydrogen gas filter 12 may consist of metals permeable to hydrogen upon heating, such as palladium, palladium alloys, for example, gold-palladium, zirconium, zirconium alloys, nickel or nickel alloys. Since the hydrogen gas filter 12 is made of such metals, it works also as a catalyst for dehydrogenation of alcohol, upon being heated to a siutable degree of temperature, e.g. 200 to 600° C., preferably 400–500° C. in the case of Pd, or 500–600° C. in the case of Zr, Ni or Ti. The top portion 15 of the vacuum gauge 11 may consist of, for example, koval having sufficient affinity with glass or palladium for close bonding therewith to provide a fully sealed construction. The interior of the vacuum gauge 11 is normally maintained at a vacuum of $10^{-4}$ mm. Hg max.

When there is determined the alcohol content of drivers breaths, a guide pipe 3a attached to one end of the adsorbent seal tube 3 is inserted into the alcohol content determining device 10 so as to surround the hydrogen gas filter 12. The other end of said adsorbent seal tube 3 is fitted with a plug 16 made of, for example, silicone rubber. Under this condition, the heater 14 is supplied with electric current to heat the adsorbent and hydrogen gas filter 12. This heating causes the moisture and alcohol adhering to the adsorbent 7 to be vaporized and spread over the inner walls of the seal tube 3. Upon further heating to a proper temperature, the alcohol content alone is thermally decomposed to release hydrogen gas. In this case the dehydrogenation reaction of alcohol occurs as shown below.

$$C_2H_5OH \rightleftharpoons C_2H_4O + H_2$$

The hydrogen gas thus evolved permeates the filter 12 heated to about 300° C. by the heater 14 into the ionization vacuum gauge 11. Other gases than hydrogen derived from the decomposition of alcohol are expelled outside through a void space 17 defined between the lower end of the adsorbent seal tube 3 and the top portion 15 of the vacuum gauge 11. Introduction of the hydrogen gas permeating the filter 12 into said vacuum gauge 11 decreases the degree of vacuum therein. The decreased degree of vacuum is determined by reading the ion current flowing through an anode plate 18 using an ammeter 19. Numerals 20 and 21 represent a cathode and a grid respectively. Since the amounts of hydrogen decomposed from alcohol are proportional to those of the original alcohol, determination of said hydrogen amounts can easily figure out the alcohol content of drivers' breaths. Upon completion of determination, the hydrogen gas is discharged to the outside by the pumping action of the ionization vacuum gauge 11 itself, thereby quickly restoring the original degree of vacuum.

FIG. 4 illustrates another embodiment of this invention. There is used a forked tube 22 with a branch tube 23 prepared from, for example, heat resistant glass, said branch tube 23 projecting substantially crosswise from the main body of the forked tube 22. In the branch tube 23 is received the adsorbent seal tube 3. Said tube 3 is heated by a heater 24 fitted to the outer periphery of the branch tube 23 to evaporate the alcohol adhering to the adsorbent placed in said seal tube 3. The other structural components are the same as those of FIG. 2. When the branch tube 23 is heated by the heater 24, the moisture and alcohol adhering to the adsorbent 7 are vaporized and spread throughout the interior of the branch tube 23. Since the outer end of the branch tube 23 is sealed with a plug 25, the vapors of moisture and alcohol are directed toward the hydrogen gas filter 12. As in the embodiment of FIG. 2, the vaporized alcohol is decomposed upon further heating to release hydrogen, which in turn is conducted through the filter 12 to the alcohol content determining device 10, where the amounts of said hydrogen are measured.

FIG. 5 shows another embodiment where the ionization vacuum gauge 11 of FIG. 2 is replaced by an ion pump 26. According to this embodiment, there is utilized the fact that the ion current passing across the electrodes 27 and 28 increases in proportion to the amounts of hydrogen introduced from the hydrogen gas filter 12 so as to determine the amounts of said hydrogen by an ammeter 29. The other structural components of FIG. 5 are the same as those of FIG. 2.

FIG. 6 denotes still another embodiment where a device for determining the amounts of hydrogen permeating the hydrogen gas filter 12 consists of a diode 30 which comprises an anode 31, cathode 32 and glass vacuum vessel 33. The sequential steps of determining the contents of alcohol by the apparatus of FIG. 6 are the same as those of FIG. 2. When hydrogen enters the diode 30 through the filter 12 the current flowing across the cathode 32 and anode 31 progressively decreases with increasing amounts of hydrogen. This decline in the current is read by an ammeter 34. If reading on the ammeter is previously collated with the amounts of incoming hydrogen, and the volumes of breaths to be conducted through an adsorbent and the heating temperature are fixed, then it will be possible accurately to determine the alcohol content of drivers' breaths. After determination, the hydrogen gas whose amounts were determined is expelled outside through the filter 12, enabling the original degree of vacuum of said diode 30 to be restored quickly ready for the subsequent use.

Use of the diode has the advantage of much more simplifying the arrangement of an alcohol content determining apparatus as well as its operation than in the case where there is used an ionization vacuum gauge or ion pump.

With any of the aforementioned apparatuses, it is easy to indicate determined values by a digital or analog system or to record said values in a recorder.

Actual tests using the aforesaid determining apparatus of this invention prove that it can measure alcohol content of the order of 0.1 mg. per liter of breath, thus improving the performance of the prior art apparatus which is capable of measuring only up to 0.25 mg. of alcohol per liter of breath.

The prior art method of determining the contents of alcohol from change in the color of chemicals placed in a detecting device eventually relied on judgment by the naked eye observation of human beings with the likely occurrence of varying values of determination due to the individual different physical and metal conditions of observers. In contrast, the determining apparatus of this invention enables the alcohol content of the breaths of drivers who happened to drink alcoholic beverage to be directly indicated by a digital or analog system, eliminating the occurrence of varying values of determination due to the individual different physcal and mental conditions of observers and permitting prominently reliable determination.

The foregoing embodiments relate to the case where the hydrogen filter assumed a test tube shape. However, this invention is not limited to this form of filter, but permits the use of other filters such as coiled or plate types. The foregoing embodiments disclose the employment of a metal such as Pd, Zn, Ni or Ti for a hydrogen gas filter thus making use of their catalytic action for dehydrogenation. However, it is also possible to employ a copper mesh as a catalyst for dehydrogenation of alcohol by interposing it between, for example, the adsorbent seat tube 3 and the hydrogen gas filter 12.

We claim:

1. Apparatus for measuring the alcohol content in breath comprising:
   a receptacle containing a quantity of adsorbent for alcohol;
   a hydrogen gas filter;
   heating means to evaporate alcohol contained in said adsorbent;
   heating means to heat said hydrogen gas filter;
   a guide pipe to conduct gaseous fluid from said adsorbent to said filter;
   a vacuum vessel joined to said filter to receive hydrogen passed through the filter;
   and electronic circuit means contained in said vacuum vessel to measure the amount of hydrogen contained in said vacuum vessel.

2. An apparatus according to claim 1 wherein the hydrogen gas filter is made of one metal selected from the group consisting of palladium, palladium alloys, zirconium, zirconium alloys, nickel and nickel alloys.

3. An apparatus according to claim 1 wherein the hydrogen gas filter has a tubular form, one end of which is plugged, and the other end of which communicates with a vacuum vessel; and the means for heating the filter is formed around the outer peripheral surface of a protective tube surrounding the filter.

4. An apparatus according to claim 1 wherein the hydrogen gas filter is received in the main body of a forked tube and the alcohol adsorbent receptacle is placed in a branch tube.

5. Apparatus as claimed in claim 1 wherein said guide pipe is integral with said receptacle and a portion thereof surrounds said hydrogen gas filter.

6. Apparatus of claim 1 wherein said heating means to evaporate alcohol and said heating means to heat said hydrogen gas filter consist of an integral helical heating element surrounding said receptacle and said filter.

7. The apparatus of claim 1 wherein said electronic circuit means is an ionization vacuum gauge.

8. The apparatus of claim 1 wherein said electronic circuit means is a diode.

9. Apparatus as claimed in claim 1 wherein said gas filter has a cylindrical wall, said guide pipe is integral with said receptacle and a portion of the guide pipe surrounds said cylindrical wall.

10. Apparatus for measuring the alcohol content in breath comprising:
   a receptacle containing a quantity of adsorbent for alcohol;
   a hydrogen gas filter;
   a dehydrogenation catalytic mesh interposed between said receptacle and said filter;
   heating means to heat said adsorbent, said catalytic mesh and said filter;
   a guide pipe to conduct gas from said receptatcle over said mesh to said filter;
   a vacuum vessel joined to said filter to reecive hydrogen passed through the filter;
   and electornic circuit means contained in said vacuum vessel to measure the amount of hydrogen contained in said vacuum vessel.

11. A method of measuring the alcohol content in breath which comprises:
   adsorbing alcohol vapor contained in breath upon a quantity of adsorbent;
   heating said quantity of adsorbent to vaporize alcohol adsorbed therein;
   dehydrogenating alcohol vaporized from said adsorbent by contact with heated catalyst means to produce hydrogen gas;
   filtering hydrogen gas produced by said dehydrogenation through a hydrogen gas filter into a vacuum vessel;
   and measuring the amount of hydrogen gas contained in said vacuum vessel.

12. The method of claim 11 wherein said vacuum vessel is an ionization vacuum gauge.

13. The method of claim 11 wherein hydrogen gas present in said vacuum vessel is expelled subsequent to said measurement of the amount of hydrogen to restore the original degree of vacuum to said vacuum vessel to prepare it for use in a repeat of said method.

References Cited
UNITED STATES PATENTS

| | | | |
|---|---|---|---|
| 3,242,717 | 3/1966 | Matle et al. | 23—254 X |
| 3,522,009 | 7/1970 | Borkenstein | 23—254 X |
| 3,545,931 | 12/1970 | McKinley, Jr. | 23—232 |
| 3,567,383 | 3/1971 | Langley et al. | 23—232 E |

MORRIS O. WOLK, Primary Examiner

R. E. SERWIN, Assistant Examiner

U.S. Cl. X.R.

23—254 E, 259; 73—26